United States Patent [19]

Bavoux et al.

[11] 4,403,300
[45] Sep. 6, 1983

[54] METHOD AND SYSTEM OF OPERATION OF AN ADDRESSABLE MEMORY PERMITTING THE IDENTIFICATION OF PARTICULAR ADDRESSES

[75] Inventors: Robert J. A. Bavoux, Rueil Malmaison; Francis R. J. M. Lemaire; Pierre Salkazanov, both of Plaisir, all of France

[73] Assignee: Compagnie International pour l'Informatique, Societe Anonyme, Paris, France

[21] Appl. No.: 135,097

[22] Filed: Mar. 28, 1980

[30] Foreign Application Priority Data

Apr. 6, 1979 [FR] France ................... 79 08716

[51] Int. Cl.³ .............................................. G06F 13/06
[52] U.S. Cl. .................................................. 364/900
[58] Field of Search ... 364/200 MS File, 900 MS File; 365/200; 371/10, 21

[56] References Cited

U.S. PATENT DOCUMENTS 2,843,841 7/1958 King et al. .
3,611,315 10/1971 Murano et al. ................ 364/200
3,633,175 1/1972 Harper .......................... 364/200
4,045,779 8/1977 Markle .......................... 364/200
4,089,063 5/1978 Takezono et al. .............. 364/200

FOREIGN PATENT DOCUMENTS 2714314 10/1978 Fed. Rep. of Germany .
2412107 7/1979 France .
1254929 11/1971 United Kingdom .

Primary Examiner—Thomas M. Heckler
Attorney, Agent, or Firm—Kerkam, Stowell, Kondracki & Clarke

[57] ABSTRACT

The invention relates to data processing systems which make use of an addressable memory. It proposes a method and a system of operation which permits one to particularize or mark for future reference, as desired, certain addresses in the addressable memory by the creation of indicators associated with the particular addresses. These indicators are activated each time one of the particular addresses is called and the system is informed that it has just called up one of the addresses having an associated indicator. The indicators are locations which access subroutines.

20 Claims, 7 Drawing Figures

METHOD AND SYSTEM OF OPERATION OF AN ADDRESSABLE MEMORY PERMITTING THE IDENTIFICATION OF PARTICULAR ADDRESSES

Cross reference is made to co-pending applications Ser. Nos. 135,079 and 135,098, filed Mar. 28, 1980, by the some inventors and assigned to the same assignee as the present invention.

The invention relates to addressable data memory device used in data processing systems, and has as an object a method and a system of data processing having an addressable memory predetermined addresses in the addressable memory to be flagged.

The system according to the invention, when an addressable memory is used, advantageously permits previously marking the addresses to be particularised and notifying the utilising means each time that one of these addresses is requested.

This invention relates mainly to data processing systems employing microprocessors and in which the predetermined addresses of the addressable memory constitute particular positions and, on behalf of the microprocessors, call on specific processes generally obtained by calling up sub-routines.

This is the particular case of certain automatic industrial machines for controlling, for example, a machine tool. The particular addresses are for example control program addresses for which the commands change the destination, either a change of tool or a change of tool holder or a change of movement.

It is also the case for control devices for transfer of data betweem the peripherals and the central memory of a computer. The particular addresses are, for example, boundary addresses of buffer memories intended for the transfer.

In such data processing systems, the processing unit, under the control of a processing program, draws data as required from a data memory which is an addressable memory. This memory contains locations for holding the data to be stored. To reach these locations the microprocessor defines their addresses. In the course of progression of the processing, the address of the data requested evolves. It often occurs that it is useful for the processing unit to be warned when it reaches certain predetermined addresses, which will be called particular addresses. These addresses constitute mainly boundaries such as, for example, the limits of a register and call on specific processes obtained, for example by branching towards a specific sub-routine of the program.

In current data processing systems this situation is dealt with by providing a device for surveillance of the stored addresses called by the processing unit. One method consists in carrying out a systematic comparison of any address called with the contents of one or several registers; these contents represent particular addresses to be watched for. This method calls for a comparison operation on each cycle of the processing unit which makes calls on the memory. This means additional circuits and loss of time. There is an increase in the price of the data processing system and a slowing of its operating speed. Another method consists in taking into account the distance which separates the current instruction address from the nearest particular address by means of a counter. Each evolution of the current address varies the contents of the counter in the appropriate direction. Movement of the counter to zero indicates that the particular address has been obtained. This method has the same drawbacks as the preceding one.

In order to reduce the abovementioned drawbacks, the invention proposes a method and device consisting in associating an indicator controlled by the processing unit with the particular addresses of the data memory, the roll of which is to inform this processing unit each time it calls on a particular address.

To this end, the invention provides a method of exploitation by utilisation means of the data contained in an addressable memory of the type which consists in particularising determined addresses of the addressable memory and in utilising the addressable memory principally by calling from the processing means addresses of the memory, charcterised in that the said particularisation of the addresses comprises writing indicators in an indicator storage means associated with the said particularised addresses, the said indicators originating in the said processing means, and in that the utilisation of the addressable memory comprises the control of the said indicator storage means each time that the called address is one of the particularised addresses so as to generate one item of data relative to the indicator corresponding to the particularised address and to transmit this data to the processing means.

According to another characteristic of the method of the invention, the said indicators have different configurations or values, the different configurations being defined by the processing means.

According to another characteristic of the method of the invention, the said particularisation comprises an intermediate stage before the writing in the indicator storage means; in this intermediate stage the utilisation means transmit the said indicator to the intermediate means which in their turn transmit the said indicator for writing in the indicator storage means and, when a specified address is requested, said utilisation of the said addressable memory comprises the stimulation of intermediate means for transmission to the processor means of information relative to the said indicator.

It will also be noted that, according to the invention, the transmission of the information relative to the indicator comprises a first phase of signalling the presence of the indicator in the said indicator storage means and a second phase in which the said indicator is transmitted in its turn on request by the processing means which have been alerted in the course of the first phase.

The invention also provides a data processing system for carrying out the method according to the abovementioned characteristics and of the type comprising at least one addressable data memory to store the data, data processing means to use the data, these processing means comprising processing circuits for processing the said data, addressing circuits for addressing the storage locations of the said data in the said data memory on the orders of the processing circuits, an input/output buffer register connected to the processing circuits to contain the data which is the subject of an exchange between the processing circuits and the addressable memory, the data processing system further comprising communication means which comprise an address bus for linking the address circuits with the data memory, a data bus for connecting the input/output buffer register with the data memory, a control bus to check the exchanges between the processing circuits and the addressable memory.

This system of operation is characterised in that it comprises means for particularisation of the addresses of the data memory for particularising particular addresses of the data memory by writing, on the instructions of the said processing circuits, indicators in the locations associated with the addresses, which belong to the said indicator storage means, which associated location respond to calls on the said particular addresses by the said processing circuits by transmission of data relative to the indicators to the said processing circuits.

The invention also relates to a data processing system comprising intermediate means situated between processing circuits and the indicator storage means to control the exchanges of the data relative to the indicators between the processing circuits and the indicator storage means to permit the processing circuits to defer the operation of the indicators.

The invention also relates to a data processing system characterised in that the intermediate means have a control means to inform the processing circuits that they have just called on one of the particularised addresses.

According to another embodiment of the invention, the associated locations are contained in an indicator memory, which indicator memory is a memory similar to the said data memory, of which the addressing is ensured by the addressing circuits of the processing means.

According to another embodiment, the said intermediate means are formed by an addressable device of the type used to connect the said processing circuits to the peripheral devices with which they exchange data.

It will be understood that the invention also extends to the integrated circuit boards, modules or analogous components which incorporate a logic sysem coresponding to the preceding characteristics. Other objects, characteristics and advantages of the present invention will become apparent from the text which follows, given with reference to the accompanying drawings, which illustrate preferred embodiments of the invention.

Figure 4:
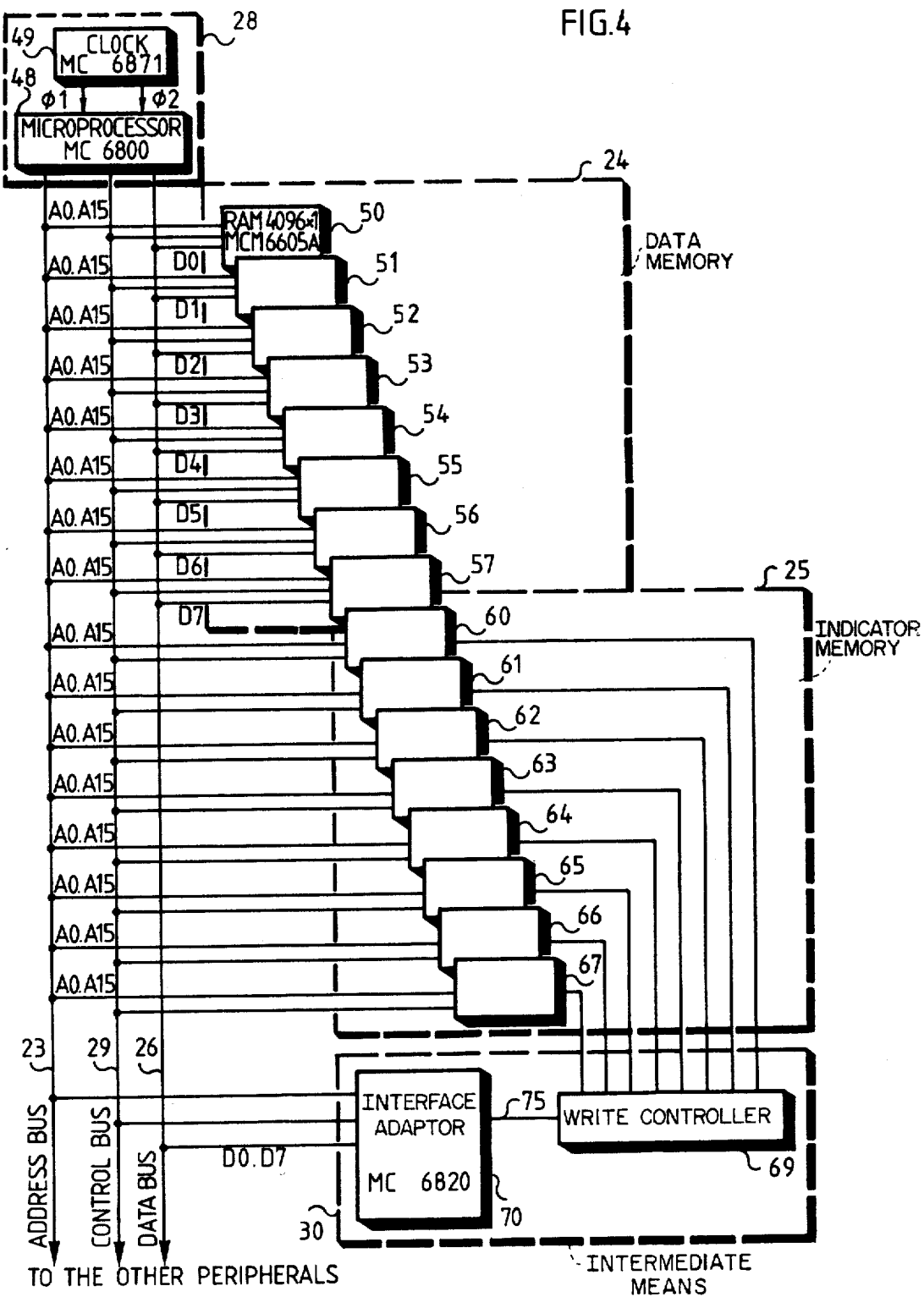
FIG. 4 shows schematically an embodiment of the modification of FIG. 3 based on a MOTOROLA MC 6800 microprocessor.
Figure 5:
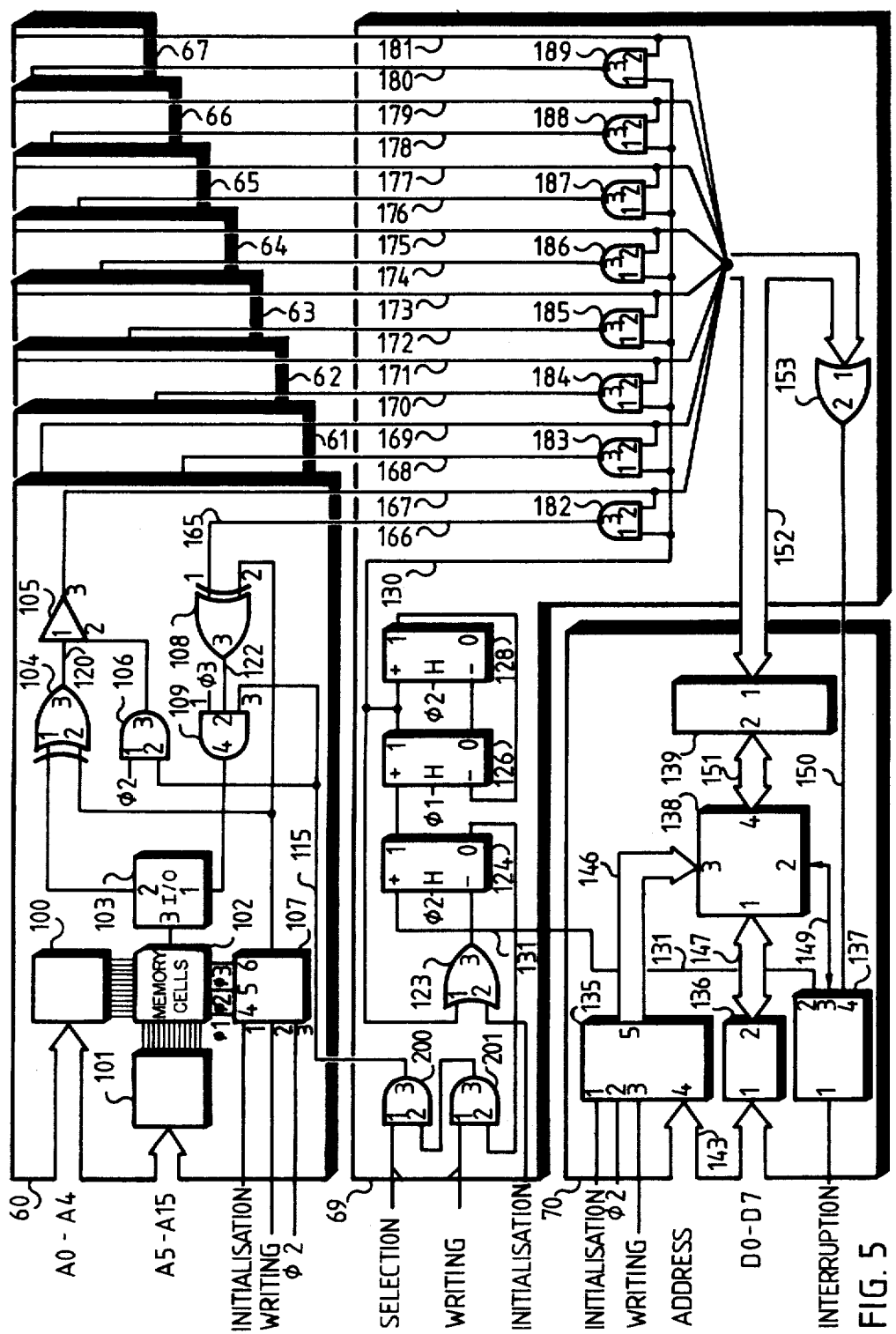
Figure 6:
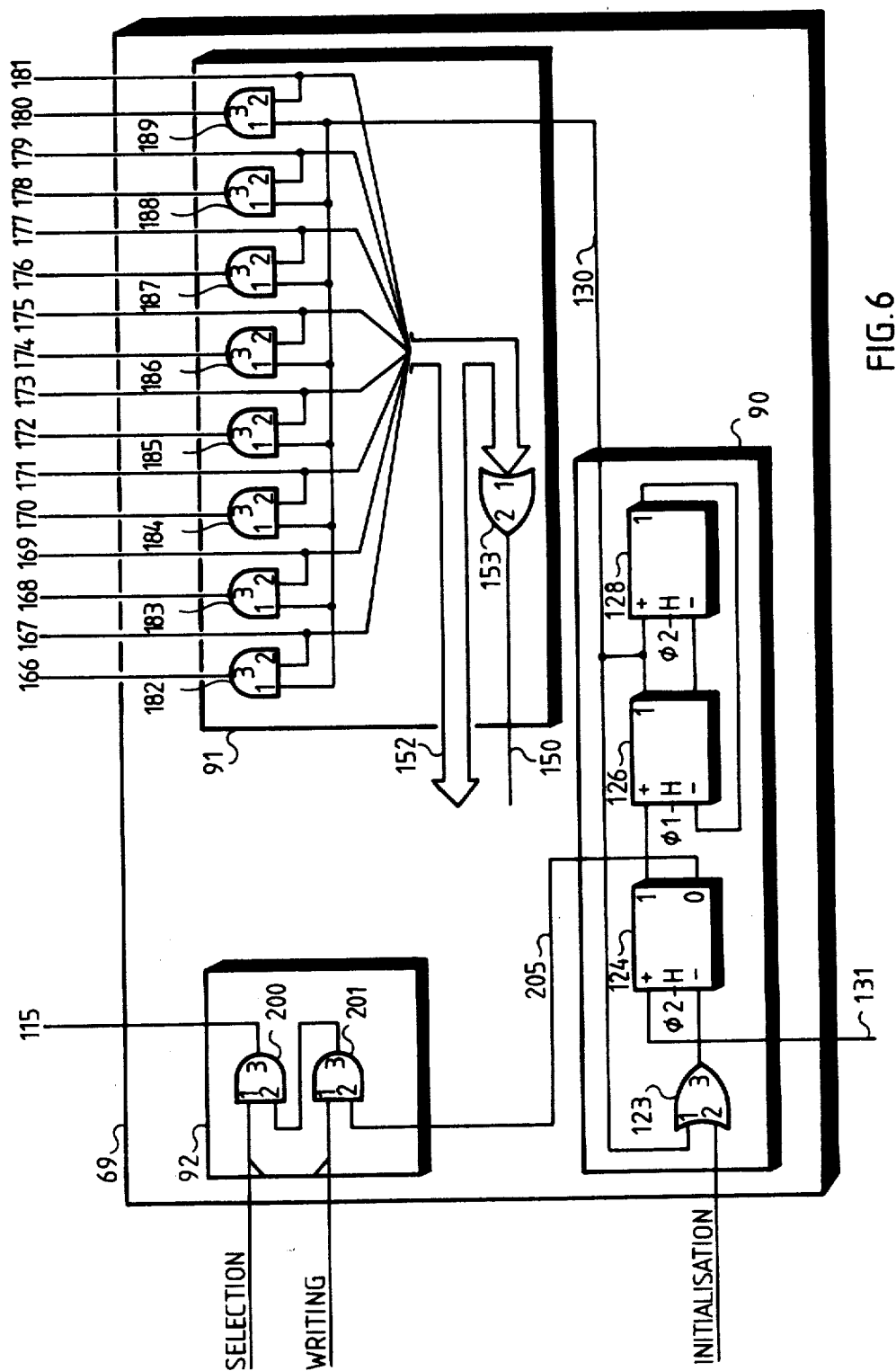
Figure 7:
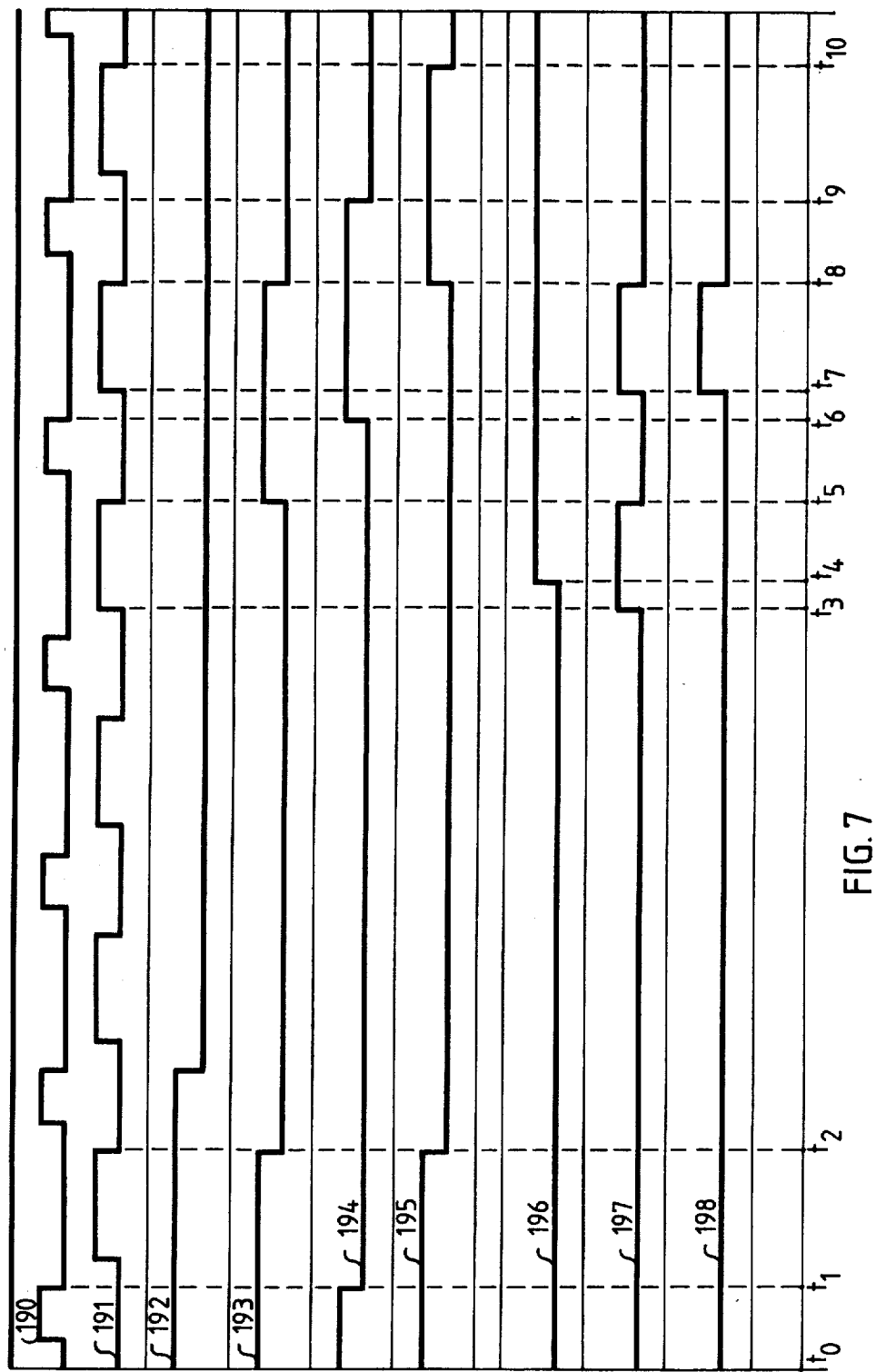

FIG. 5 shows in detail the indicator memory circuits and the circuits associated with the arrangement of FIG. 4, FIG. 6 shows in detail the writing standardiser controller of FIG. 5, FIG. 7 shows a chronogram of the electric signals employed during operation of the preceding circuits in the case of writing in the memory of the indicators. In order to illustrate the method which is the object of the invention, FIG. 1 shows the flow diagram of the operations which take place in a data processing system using said method.

For clarity of the text, it is assumed that this flow diagram relates to the operation of a data processing system comprising, inter alia, a microprocessor and associated circuits such as those described for example, in the document published by the MOTOROLA Company in February 1976, referenced 9701-5 (IMPERIAL LITHO B 55769) and entitled M6800 MICROCOMPUTER SYSTEM DESIGN DATA. In the course of its operation, the microprocessor must obtain the instructions contained in an addressable memory which will be called the data memory. The address of the instructions to be obtained is contained in an ordinal counter or instruction counter. This address is communicated to the addressable memory which, in return, on request by a read cycle, will transmit the contents of the address thus called. The instructions thus obtained are placed in an instruction register. From this register, the instructions are decoded so as to deduce from them the operations necessary for their execution by the processing circuits. Conversely, the microprocessor can store instructions or data in the addressable memory by calling up the storage address, by transmitting the instructions or data to be stored and by requesting a recording or write in memory cycle. When an instruction has been obtained, the microporcessor orders the advance of the ordinal counter; the contents of the counter is then the address of the next instruction.

Figure 1:
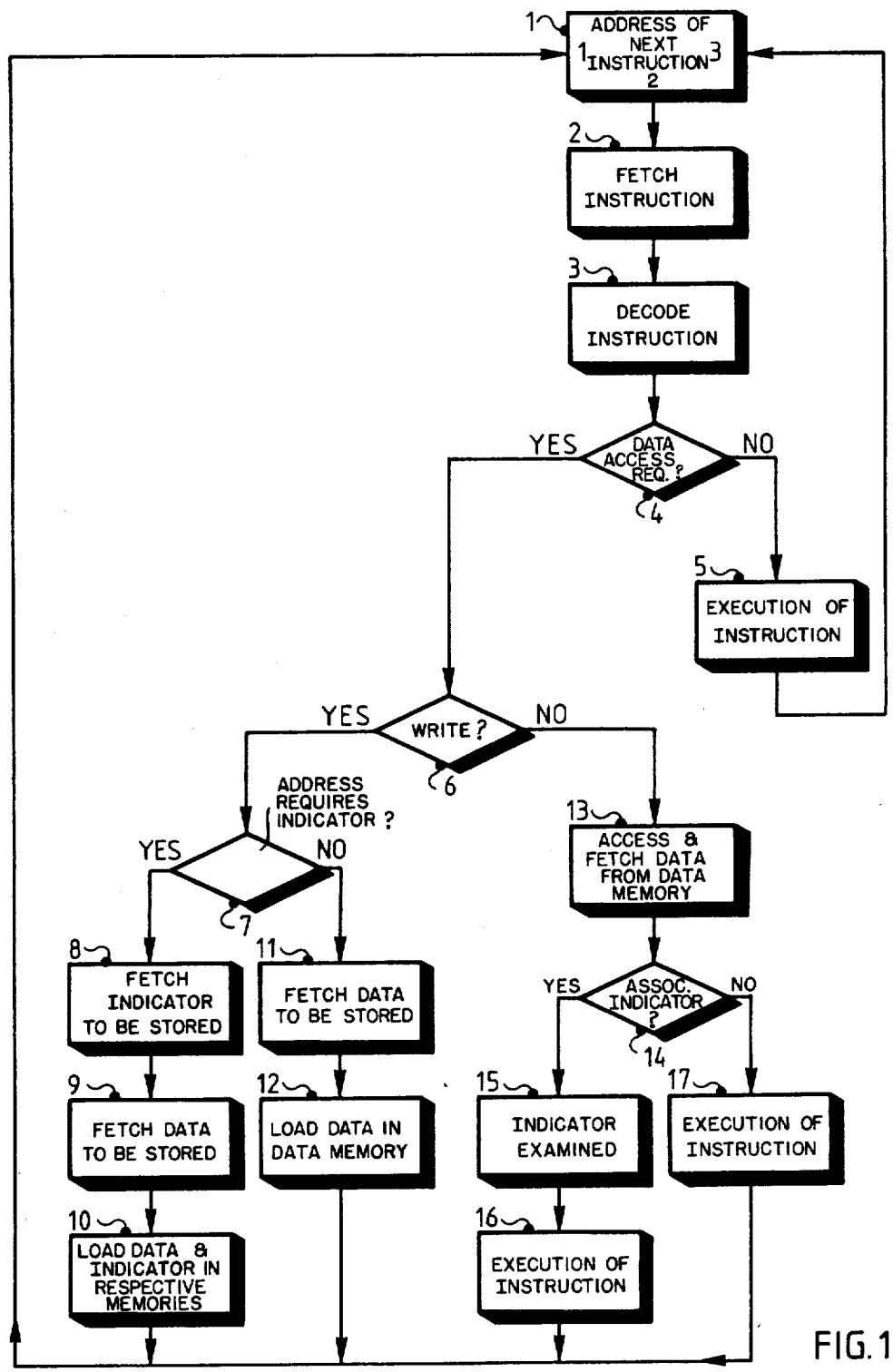
FIG. 1 shows a flow diagram of the operations which take place in a data processing system using the method according to the invention.

In FIG. 1, block 1 represents the operation of definition of the address of the next instruction. Permission to carry out this definition arrives via terminals 1 or 3 of the block 1. When this address is defined, the system effects acquisition of the instruction contained at this address. This acquisition is represented by the block 2. This operation is followed by the operation of decoding the instruction which is shown by the block 3. This decoding permits the system to recognise the nature of the operations defined by the instruction. It is thus possible to known if these operations require a data memory cycle, this determination being made at block 4.

If the instruction does not call up the memory, it is carried out at 5 and after execution the order is given to the program to proceed to the following instruction by an end of execution signal applied to the input 3 of the block 1.

If the instruction calls up the memory, the memory cycle requested is examined at 6 to see if it is a read cycle or a write cycle.

If it is a write cycle, the system determines at 7 if the called address should be assigned an indicator associated with the data contained in this address. If so, the system acquires the configuration or value of the associated indicator at 8. Then the system acquires at 9 the data to be stored in the memory. Finally at 10, the system effects, on the one hand, the loading of the associated indicator into the indicator memory and on the other hand, the loading of the data into the data memory. These two loading operations being completed, the system causes the progression of the program via the input 1 of the block 1.

If the write cycle does not comprise an indicator associated with the data to be stored, the system acquires the data to be stored at 11, and it loads the data into the data memory at 12 and then restarts the progress of the program via terminal 1 of the block 1.

If the cycle requested at the memory is a read cycle, the system will carry out this cycle at 13. The result of this cycle is examined at 14.

If the cycle gives a data as a result of if the address where this data was found comprises an associated indicator, this indicator is examined at 15. This indicator characterises the address read and the microprocessor effects the corresponding processing at 16. The end of this processing restarts the progression of the program via the input 1 of block 1.

In the event that the read cycle does not show the presence of an indicator, the data obtained is used at 17 in conformity with the instruction loaded at 2. Once this operatiuon is finished, the control is returned to the programme at the request of the input 1 of the block 1.

In short, it can be said that the data memory comprises addresses particularised or flagged by the indicators. This particularisation is obtained in writing by associating an indicator with the addresses concerned. On reading a particularised address, the calling of this particularised address causes the associated indicator to appear at this address. This indicator furnishes the system with information concerning the address to which the indicator is associated. This indicator can contain, for example, the indication of the limit of a memory zone.

Figure 2:
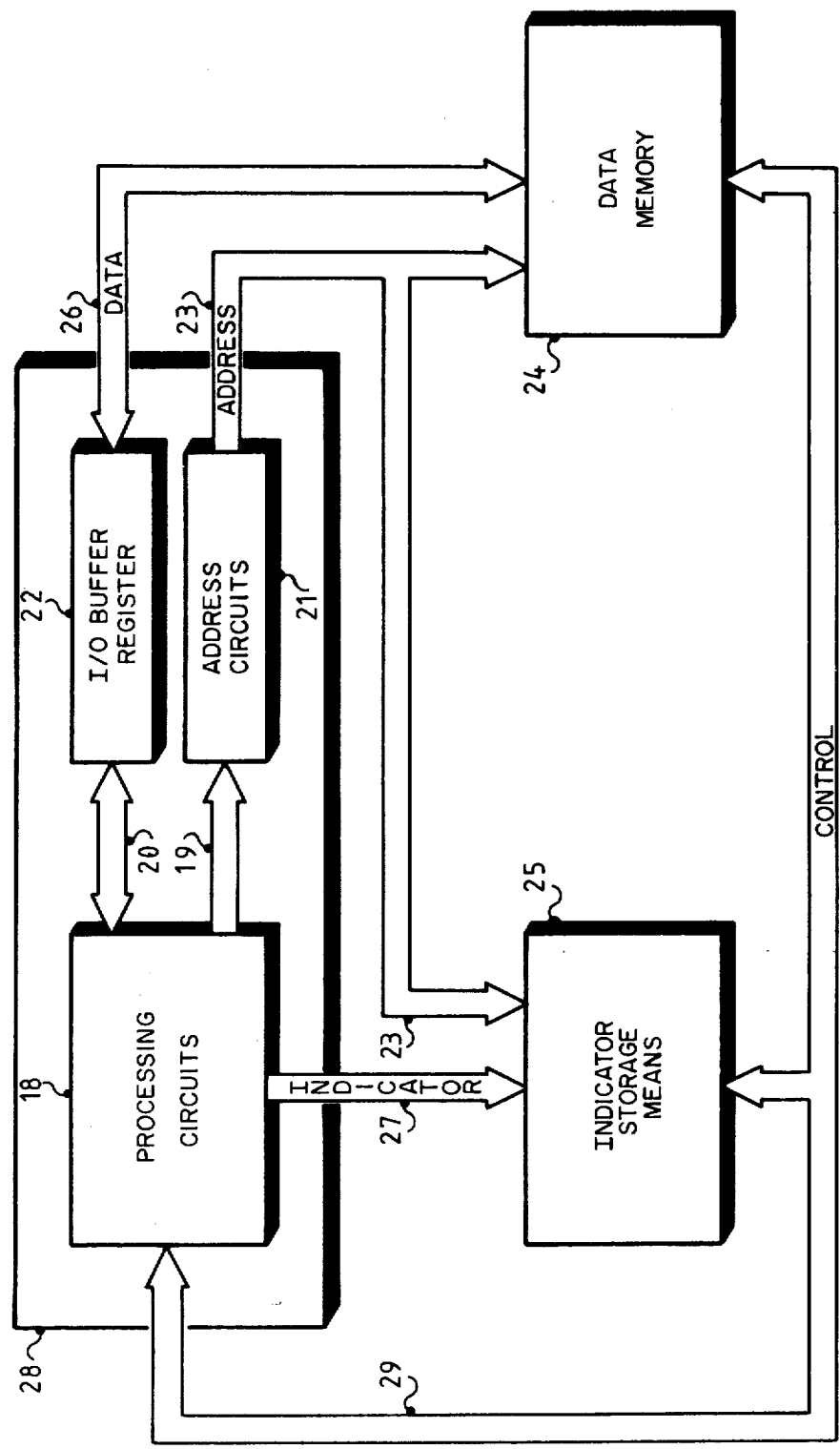
FIG. 2 is a schematic representation of an arrangement permitting application of the method described in the preceding figure.

FIG. 2 shows a data processing system making use of the method which has just been described. The processing system is shown in the form of functional blocks. The functional block 28 represents data utilisation means. Inside this block are shown:

Data processing circuits at 18,
Address circuits at 21,
The input/output buffer register at 22.

The data processing circuits 18 are connected by a connection 19 to the address circuits 21, via a connection 20 to the input/output buffer register 22, by a connection 27 to the particularisation means 25, and by a connection 29 to the data memory 24 and to the indicator storage means 25. The connection 27 is the indicator bus and the connection 29 is the control bus. The output of the address circuits 21 feeds the address bus 23. The output of the buffer register 22 feeds the data bus 26. The address bus 23 is connected to the data memory 24 and to the indicator storage means 25.

The data memory 24 therefore possesses three inputs fed respectively by the address bus 23, the control bus 29 and the data bus 26. The indicator storage means 25 also possess three inputs fed respectively by the address bus 23, the control bus 29 and the indicator bus 27.

When the processing circuits 18 wish to exchange data with the data memory 24 and an indicator with the indicator storage means 25 they place the location address, where the data and the above-cited indicator are to be found, on the connection 19 which supplies the address circuit 21, these latter supplying the address bus 23 which, on the one hand, has just addressed a location in the data memory 24 and, on the other hand, has just addressed a location in the indicator storage means 25; it is seen that the address of the two locations is the same address in both devices. It is sufficient for the indicator storage means to have one location available for each of the data to be particularised in order to record therein the corresponding indicator. Furthermore, the processing circuits 18 place the signals defining the nature of the operating cycle requested from the memories 24 and 25 on the control bus 29. If the processing circuits 18 wish to obtain a write cycle they must, before starting this write cycle, on the one hand, place the data to be stored on the connection 20 which charges the data input/output buffer register 22 which in its turn transmits the data to the data bus and, on the other hand, if it is a matter of data to be particularised, they must place the indicator corresponding to this address on the indicator bus 27. These operations being completed, the processing circuits 18 start the write cycle which introduces respectively the data placed on the data bus 26 into the data memory 24 and the indicator located on the indicator bus 27 into the indicator storage means 25.

It is seen, therefore, from what has just been described that the processing circuits 18 can, in the course of a write cycle, store data in the data memory 24 and, if the address called is to be particularised, charge the indicator storage means 25 with the indicator corresponding to this address. This indicator will hereinafter be called the indicator associated with the particularised address.

In the case of a read cycle the address operations are the same as above but on the control bus the processing circuits 18 control a read cycle. The processing circuits 18 then start a read cycle. This read cycle provides data which is contained in the addressed location at the output of the data memory 24, that is on the data bus 26. The data bus 26 transmits this read data to the input/output buffer register 22 which in its turn transmits this data to the processing circuit 18 via the connection 20.

Similarly, a read cycle has also been executed in the particularisation means 25. If in the address location, which is found therefore, at an address associated with that of the data, an indicator is found which proves that it is a matter of particularised address, this indicator is placed at the output of the particularisation means 25 and, at the same time, transmitted by the bus 27 to the processing circuits 18. If the reading of this address by the indicator storage means 25 does not furnish an indicator, this means that this address is not a particularised address and no signal is supplied to the indicator bus 27.

Figure 3:
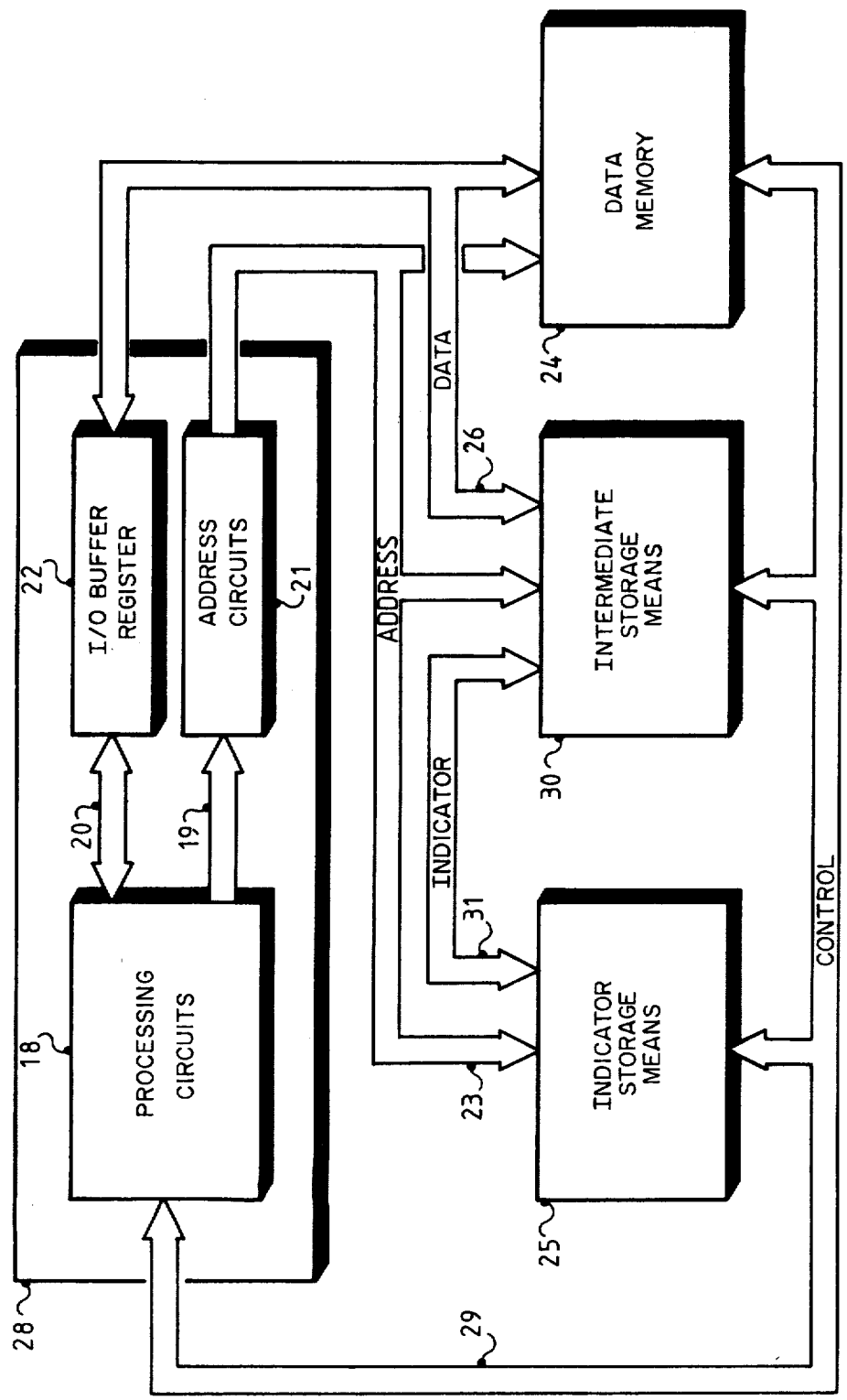
FIG. 3 is a schematic representation of a modification of the arrangement shown in FIG. 2.

FIG. 3 shows a variation of the system shown in FIG. 2. In this variation the intermediate storage means 30 has been interposed between the utilisation means 28 and the indicator storage means 25. The transmission of indicators is not made directly through an indicator bus 27. The indicator storage means 25 are connected to the address bus 23, to the control bus 29 and to the deferred indicator bus 31. The deferred indicator bus 31 is connected at its other end to the intermediate means 30. These intermediate means 30 are also connected to the address bus 23 and the data bus 26.

When the utilisation devices 28 wish to write data in the data memory 24 by associating an indicator with the called address, they proceed in the following manner. They place the address of the intermediate means 30 on the address bus 23, they place the indicator which is to be associated with the associated address on the data bus 26 and the order to execute a write cycle on the control bus 29. This set of signals applied on the intermediate means 30 will cause the introduction of the indicator into the intermediate means 30. In the following cycle the utilisation means 28 place the address of the data to be written in the data memory 24 on the address bus 23, the data to be written in the data memory 24 on the data bus 26, and the order to execute a write cycle on the control bus 29. This set of signals applied on the data bus 24 and on the indicator storage means 25 will cause the execution of a write cycle on these two memories 24 and 25. For the data memory 24 this write cycle will store the data placed on the data bus 26 in the location of the data memory 24, this data being defined by the address located on the address bus 23. For the intermediate means 30, this write cycle order will place the previously received indicator on the deferred indicator bus 31. For the indicator storage means 25, this write cycle causes the storage of the indicator placed on the deferred indicator bus 31 in the indicator storage means 25 location defined by the address placed on the address bus 23.

When the utilisation means 28 wish to read the contents of a location of the data memory 24 they place the location address to be read on the address bus 23 and order a read cycle on the control bus 29. The arrival of the signals carried by these two buses on the data memory 24 triggers the execution of the data memory 24 read cycle. This read cycle places the data contained in the location designated by the address placed on the address bus 23 on the data bus 26. At the same time the indicator storage means 25 receive, via the address bus 23, the address of the location read in the data memory and a read order via control bus 29 and execute a read cycle of the contents of these indicator storage means 25 location having the same address as that called in the data memory 24. If there is an indicator stored in this location, the read cycle places this indicator on the deferred indicator bus 31. This deferred indicator bus 31 transmits this indicator to the intermediate means 30. In order to know if the address code comprises an associated indicator, the exploitation means 28 asks the intermediate means 30, via an appropriate command placed on the control bus 29, to place on the data bus 26 the results of the reading effected at the address code in the indicator storage means 25. If there is no associated indicator no signal will be transmitted on the data bus 26. If there is an associated indicator this indicator will be placed on the data bus 26.

According to a modification of the data processing system which has just been described, the indicator storage means 25, after a read operation of the contents of a location defined by an address, alert the utilisation means 28 in the case of detection of the presence of an indicator associated with the called address. For this purpose, they place a signal on the control bus 29 informing the utilisation means 28 of the existence of an indicator associated with the called data. This information of the utilisation 28 of the existence of this indicator avoids having to ask the intermediate means 30 for a special cycle.

According to another embodiment of the system, the indicator storage means 25 are formed by a memory similar to the data memory 24. This memory is called an indicator memory 25, due to its resemblance to the data memory 24.

According to another embodiment of the exploitation system, the intermediate means 30 are formed by an addressable device similar to those used to connect the data utilisation means 28 with the peripheral means: the intermediate means 30 are considered by the utilisation means 28 as a particular peripheral means. The system and its variations will be better understood with the aid of FIG. 4 which shows a preferred embodiment of the invention based on a MOTOROLA MC 6800 microprocessor.

The utilisation means 28 are formed by a clock 49 of the type MOTOROLA MC 6871 and a microprocessor 48 of the type MOTOROLA MC 6800.

The MC 6871 clock 49 produces two synchronisation signals which define the phases of operation of the whole system. These two signals are said to be called $\Phi_1$ and $\Phi_2$. These signals are transmitted to the microprocessor 48.

The microprocessor 48 is connected to the rest of the system which it controls by means of three buses:

an address bus 23 which carries the address called by the microprocessor 48. It comprises 16 lines each representing one of the binary weights defining the address. These lines are referenced in the text which follows by $A_0, A_1, A_2, A_3, A_4, \ldots, A_{14}, A_{15}$.

a data bus 26 which ensures the exchange of data between the microprocessor 48 and the different circuits which it controls. It comprises 8 lines each representing one of the binary digits defining the data which is the object of the exchange. These lines are referenced as $D_0, D_1, D_2, D_3, D_4, D_5, D_6, D_7$.

a control bus 29 which permits the microprocessor 48 to transmit orders to the controlled circuits and to receive replies from them. It comprises lines carrying the following signals:

Clock signals $\Phi_1$ and $\Phi_2$

The initialisation signal which will be referenced as INITIALISAT, which serves to put the circuits into an initial state.

The write cycle control signal which will be referenced as WRITING and which, when this is at a high level, controls the execution of the write cycles whereas, when it is at a low level, it controls the execution of a read cycle.

The signal for validation of the address placed on the address bus 23 which is referenced SELECTION.

The signal for masking interruptions which will not be used in the text which follows.

The interruption request signal referenced as INTERRUPT, which is produced by the controlled circuits when the latter require an intervention of the microprocessor 48.

The above mentioned MOTOROLA technical document gives all the details concerning these signals and their use.

The data memory 24 is formed by eight integrated circuits of the MOTOROLA type MCM 6605A. These circuits are shown at 50, 51, 52, 53, 54, 55, 56, 57. Each of these circuits is an addressable memory comprising 4096 locations with a capacity of 1 bit. The circuit 50 stores the data bits 0, circuit 51 stores bit 1 and so on up to integrated circuit 57 which stores bit 7.

The indicator memory 25 is similar to the data memory 24 in that it comprises eight circuits referenced 60, 61, 62, 63, 64, 65, 66, 67. Integrated circuit 60 stores the in indicator bits 0 and so on up to integrated circuits 67 which stores the indicator bits 7.

The locations of these two memories 24 and 25 are addressed by means of the address bus 23.

The data memory 24 exchanges the data which it stores with the microprocessor through the data bus 26: the circuit 50 exchanges the 0 bit via line $D_0$, the circuit 51 exchanges bit 1 through the line $D_1$ and so on up to the circuit 57 which it does so via the line $D_7$.

The indicator memory 25 exchanges the indicator bits with the microprocessor 48 through the intermediate means 30 which play the part of a relay, to a certain extent. These intermediate means 30 comprise an indicator write standardiser 69 and an interface adaptor 70. The interface adaptor 70 is a MOTOROLA integrated circuit of the type MC 6820. This circuit can carry the connection of the two peripherals. In the system shown in the figure, use is made of these two connection possibilities. The possibility of connections used is sometimes employed in the read mode and sometimes in the write mode according to the commands of the microprocessor. Of course it is perfectly possible to use both the two connection alternatives and in this case each of the connection alternatives is used only for one method of operation: one of the alternatives is used for the write mode and the other alternative is used for the read mode.

The operation of the integrated circuits 50 to 57, 60 to 67 and 70 is described in the MOTOROLA documentation. Operation of the write unifier 69 is explained hereinafter.

FIG. 5 is intended to illustrate the operation of the write unifier 69. In this figure are therefore shown, only the circuits directly involved in the operation of this unifier 69; i.e.:

the eight integrated circuits (60, 61, 62, 63, 64, 65, 66, 67) constituting the indicator memory 25, the integrated circuit 70 which is the interphase adaptor circuit, the indicator write controller 69, the buses are not shown but the lines used are designated by their mnemonic name: $A_0 \ldots, A_{15}$ for the address bus lines 23, $D_0 \ldots, D_7$ for the data bus lines 26, INITIALISAT, WRITING, $\Phi_1$ $\Phi_2$ INTERRUPT for the control bus 29 lines.

Only the integrated circuit 60 is shown in detail in this figure. The central part is the memory cell network 102. The cell to be obtained for reading or writing is addressed on the one hand by the column decoder 100 and on the other hand by the line decoder 101. The column decoder 100 is supplied by lines $A_0$, $A_1$, $A_2$, $A_3$, $A_4$ of the address bus 23. The line decoder 101 is supplied by lines $A_5$ to $A_{15}$ of the address bus 23. The internal clock of this integrated circuit 60 is shown at 107. This internal clock 107 receives the initialisation signal INITIALISAT on its input 1, the WRITING signal on its input 2 and the clock signal "$\Phi_2$" on its input 3. The outputs of this internal clock 107 are: the clock signal "$\Phi_1$" at 4, the clock signal $\Phi_2$ and the clock signal "$\Phi_3$" at 6. These three clock signals "$\Phi_1$", "$\Phi_2$", and "$\Phi_3$" will supply the memory cells network 102 to control the phases of operation of these said memory cells. The data input/output circuits of the memory are shown at 103. These input/output circuits 103 receive, on their input 1, the value of the bit to be recorded in the case of a write cycle or of the value of the bit to be recorded in the case of a refresher cycle. The output 2 of the input/output circuit 103 transmits the value of the bit read to the location selected by the address in the case of a read cycle or in the case of a refresher cycle. The terminal 3 of the circuit 105 is connected to the memory cell network 102. In the case of a write cycle or a refresher cycle, this terminal 3 of the input/output circuit 103 will send the value of the bit to be recorded or rerecorded to the memory cell network 102. In the case of a read cycle, this terminal 3 will receive the value of the bit contained in the cell selected by the decoders 100 and 101 from the memory cell network 102. The terminal 1 of input/output circuit 103 is supplied by the output 4 of the gate 109. This gate 109 receives the clock signal "$\Phi_3$" issued by the internal clock 107 on its terminal 1, a signal transmitted by the output 3 of the EXCLUSIVE OR circuit 108 on its terminal 2 and a selection signal transmitted by the indicator write controller 69 on its terminal 3. The EXCLUSIVE OR circuit 108 receives the value of the bit to be stored on its input 1 transmitted by the write controller 69 in the case of writing. The terminal 2 of the input/output circuit 103 supplies the input 1 of the EXCLUSIVE OR circuit 104. This EXCLUSIVE OR circuit 104 receives at its input 2 a signal 115 transmitted by the internal clock 107. The output 3 of this circuit 104 supplies the input 1 of the controlled amplifier 105. This controlled amplifier 105 receives a signal transmitted by the gate 106 on its control input 2 and, in the case of a read cycle, its output 3 sends the value of the bit read to the indicator write controller 69. The conditioner 123 receives the clock signal $\Phi_2$ on its input 1 and a selection signal transmitted by the indicator write controller 69 on its input 2.

As has been said above, the integrated circuit 70 referenced MOTOROLA 6820 is provided by the manufactor for the attachment of two peripherals to the buses 23, 26 and 29. In the embodiment described in this example, only one of these alternatives for attachment is used. In the figures only the operational units used by the invention are represented. There are five of these units. An operation control block 135, an upstream buffer register 136, an interruption control block 137, a transfer control block 138 and a downstream buffer register 139. A multiple link 146 connects the terminal 5 of the function control block 135 and the multiple terminal 3 of the transfer control block 138. A bus 147 connects the multiple terminal 2 of the upstream buffer register 136 and the multiple terminal 1 of the transfer control block 138. A bus 151 connects the multiple terminal 4 of the transfer control block 138 and the multiple terminal 2 of the downstream buffer register 139. A multi-wire connection 149 connects the multi-wire terminal 2 of the transfer control block 138 and the multi-wire terminal 3 of the interruption control block 137. The transfer control block 135 further comprises four terminals of which one is multiple. The initialisation line INITIALISAT arrives on terminal 1. The clock distribution line $\Phi_2$ arrives on terminal 2. The write control line WRITING arrives on terminal 3. Four address bus 23 lines $A_0$, $A_1$, $A_{11}$, $A_{15}$ and a validation line SELECTION arrive on the multi-wire terminal 4. The upstream buffer register 136 receives eight lines $D_0, \ldots, D_7$ on its multi-wire terminal 1 upstream of the data bus 26. The interruption control block 137 receives an interrupt application INTERRUPT line on its terminal 1, a line 131 connected to the input (+) of the flip-flop 124 of the write controller 69 on its terminal 2, and a connection 150 connected to the output 2 of the write unifier gate 153 on its terminal 3. The buffer register 139 receives on its multi-wire terminal 1 a bus 152 connected to the terminal 1 of the gate 153 and to the terminals 2 of the various gates 182 to 189, according to a distribution which will be defined hereinafter.

The write unifier or controller 69 is also shown in FIG. 6. In this figure the unifier circuits are grouped according to function. The block 90 is the control block of the write unit, block 91 is the control block of exchanges between the indicator memory 25 and the interface adaptor 70 and block 92 is the control block for write operations in the indicator memory 25. In the figure the flip-flops are shown as follows: the two input signals are indicated by the signs (+) and (−) and the outputs by the signs 1 and 0. The flip-flop comprises a clock input indicated by the letter H.

The write unit control block 90 comprises OR gate 123, flip-flop 124, flip-flop 126 and flip-flop 128. Terminal 1 of the mixer OR gate 123 receives the line 130 upstream of the output 1 of the flip-flop 126 and terminal 2 receives the initilisation line INITIALISAT upstream of the control bus 29. The output 3 of the mixer OR gate 123 is connected to the input (−) of the flip-flop 124. The input (+) of the flip-flop 124 is connected to the connection 131. The output 1 of the flip-flop 124 is connected to input (+) of the flip-flop 126. The output 0 of the flip-flop 124 supplies the line 205 which leads to the input 1 of the gates 201 of the integrated circuits 60 to 67 of the indicator memory 25. The input (−) of the flip-flop 126 is connected to the output 1 of the flip-flop 128. Output 1 of flip-flop 126 is connected to input (+) of flip-flop 128 and output 0 of flip-flop 126 is connected to input (−) of flip-flop 128. The flip-flops 124 and 128 receive the clock signal $\Phi_2$ on their input H and flip-flop 126 receives the clock signal $\Phi_1$ on its input H.

The write operations control block 92 is composed of a gate 200 and an inverse output gate 201. The inverse output gate 201 receives the write order line WRITING on its input 1 and the line 205 which comes from the output 0 of the flip-flop 124 on its input 2. The output of this gate is connected to the input 2 of the gate 200 which receives the validation line SELECTION on its input 1. The output 3 of this gate supplies line 115 which leads to the input 3 of gate 109.

The exchange control block 91 comprises a gate 153 and eight gates 182 to 189. The bus 152 which originates from the downstream buffer register 139 is connected to the mixer 153 and to the conditioners 182 to 189 in the following manner: the bus 152 comprises eight lines corresponding through the interface adapter 70 to the eight data bus lines 26. The terminals 1 of the mixture 153 comprises eight inputs each connected to a different line of the bus 152. As far as concerns gates 182 to 189, the input 2 of each conditioner connected to a different line; conditioner 182 to the line corresponding to $D_O$ . . . conditioner 189 to the line corresponding to $D_7$. Each of the lines is extended respectively to the integrated circuit corresponding to the bit concerned: line 167 to circuit 60, line 169 to circuit 61, line 171 to circuit 62, line 173 to circuit 63, line 174 to circuit 63, line 175 to circuit 64, line 177 to circuit 65, line 179 to circuit 66, and line 181 to circuit 67. The outputs 3 of gates 182 to 189 are connected respectively to the integrated circuits corresponding to the bit concerned: line 166 to circuit 60, line 168 to circuit 61, line 170 to circuit 62, line 172 to circuit 63, line 174 to circuit 64, line 176 to circuit 65, line 178 to circuit 66 and line 180 to circuit 67.

In the description of the operation of the circuits, a detailed explantion of the operation of the integrated circuits 60, 61, 62, 63, 64, 65, 66, 67, 70, will not be given. This is described in detail in the various documents furnished by the MOTOROLA designer. The explanations which follow are limited to the explanation of the operation of the specific circuits of the invention.

It is to be noted that for technological reasons MOTOROLA documentation sometimes uses inverse signals which are called inverse signals as opposed to direct signals. This is the case, for example, for the initialisation signal which is a RESET signal. For clarity of text and to simplify the explanation, only direct values of the signals will be considered in the following, it being understood that in actual operation it is the appropriate value that is used. For example, in the text which follows, initialisation is said to be made by an INITIALISAT signal which is a direct signal.

The initialisation of the write unification controller 69 is made by applying an INITIALISAT signal on the input 2 of the gate 123. This signal goes through the gate 123 to enter by the terminal (−) of the flip-flop 124 which is synchronised by the clock signal $I_2$. The output 1 of the flip-flop 124 will therefore swing to zero on the descending front end of the clock signal $I_2$. The initialisation has no effect on the flip-flops 126, 128, because these two flip-flops mutually initialise themselves.

In effect, if the output 1 of the flip-flop 126 is high, it is supposed that the flip-flop 128 output 1 is connected to the input (−) of the flip-flop 126. Therefore if the output 1 of the flip-flop 126 is a high level this level is transmitted to the input (+) of the flip-flop 128. This causes the swing to a low level of the output 1 of the flip-flop 126. Initialisation is thus carried out automatically.

In the first place, the operation of the invention in the case of writing an indicator in the indicator memory 25 is described.

When the microprocessor 48 wishes to load an indicator into the indicator memory 25 is must carry out two operations. First of all it must store the indicator in the interface adaptation circuit 70. Then it must order a write cycle in the data memory 24. This write cycle must be effected at the address to be particularised. The execution of this write cycle in the data memory 24 causes execution in parallel of a write cycle in the indicator memory 25. During this parallel write cycle, the indicator which is stored in the interface adaptation circuit 70 is stored in the associated address in the indicator memory 25.

In order to load the indicator into the interface adaptation circuit 70, the microprocessor 48 carries out the following operations: it places the address of the interface adaptation circuit 70 on the address bus. For an interface adaptation circuit 70 of the MOTOROLA MC 6820 (0980) type, this address is defined by the lines $A_0$, $A_1$, $A_{11}$, and $A_{15}$, which are connected respectively to the terminus $RS_0$, $RS_1$, $CS_0$, $CS_2$ of the interface adaptation circuit 70.

The microprocessor 48 places the profile of the indicator to be loaded at the associated address on the data bus 26: bit 0 on line $D_0$ . . . bit 7 on line $D_7$.

The microprocessor 48 places in the control bus 29:

A write cycle command signal on the line referenced WRITING. When this line is brought to a positive voltage this means that the processor 48 requests a write cycle; if this line is brought to a zero voltage it is a read cycle that is requested, A validation signal on the line referenced SELECTION. This signal allows the transfer of the address in the interface adaptation circuit 70, A clock signal $\Phi_2$ to synchronise the operation of the interface adaptation circuit 70, The operation control block 135, having recognised its address on its multiple terminal 4 and receiving a write order on its terminal 3, places the orders to be transmitted to the transfer control block 138 on its multiple terminal 5. These orders are transmitted through the multi-wire connection 146 to the terminal 3 of the transfer control block 138. In response to these orders, the transfer control block 138 organises the internal circuits of the interface adaptation circuit 70 so that the contents of the upstream buffer register 136 are transmitted to the donwstream buffer register 139 through the multi-wire connection 147, then through the transfer control block 138 and finally across the multi-wire connection 151. In this way, the configuration of the indicator $D_0$ to $D_7$ which has been placed on the data bus 26 can be transferred to the downstream buffer register 139. This downstream buffer register 139 transmits on its multiple terminal 1 and, from there, through the multi-wire connection 152, the configuration $D_0$ to $D_7$ of the indicator to the write unification controller 69. Furthermore, the transfer control block 138 informs the interrupter control block 137 of the proper execution of the transfer of the indicator in the downstream buffer register 139. For this, the transfer control block 138 places a proper execution of transfer signal on its terminal 2, this signal entering the terminal 3 of the interruption control block 137 through the connection 149. In response to this signal the interruption control block 137 transmits from its terminal 2 and through the connection 131, a signal to the write unification controller 69 informing the latter that the configuration of the indicator is available on the connection 152. In short, the interface adaptation circuit 70 has placed the indicator configuration on the connection 152 and has informed the write unification controller 69 of this via connection 131.

In the course of the preceding operation, the microprocessor 48 has transmitted the profile of the indicator to be stored in the indicator memory 25 to the interface adaptor 70. When this transfer has been carried out it has been seen that the interruption control block 137 informs the write unification controller 69 by sending a signal on the connection 131 to arrive on the (+) terminal of the flip-flop 124 which is in the write unit control block 90. Under the action of this request, the flip-flop 124 changes state and its output 1 moves to a high level on the descending end of the clock signal $\Phi_2$. For the write unit control block 90, this high level means that the indicator configuration is available at the output of the interface adaptation circuit 70 on the bus 152. The output 1 of the flip-flop 124 is connected to the input (+) of the flip-flop 126: the flip-flop 126 therefore changes state and its output 1 passes to a high level the descending front end of the clock $\Phi_1$. The output 1 of the flip-flop 126 is connected to the line 130. This line 130, when it is high, permits the passage of the profile contained in the bus 152 through the series of gates 182, 183, 184, 185, 186, 187, 188, 189, which control the passage towards the bit input lines 166, 168, 170, 172, 174, 176, 178, 180 in the circuits 60, 61, 62, 63, 64, 65, 66, 67. The gates 182, ..., 189 therefore remain open all the time the output 1 of the flip-flop 126 is at a high level. This time is made use of by the microprocessor to request a write cycle in the data memory 24 and in the indicator memory 25. This cycle, as will be seen further on, is controlled by the write operations control block 92. The (+) input of the flip-flop 128 is connected to the output 1 of the flip-flop 126; the passage to a high level of this output switches the flip-flop 128 whose output 1 passes to a high level on the descending front end of the clock signal $\chi_2$. This high output means that writing the indicator configuration can be carried out. The output 1 of the flip-flop 128 enters at the input (−) of the flip-flop 126 whose output 1 passes at a low level on the descending front end of the clock signal $\Phi_1$. The output 0 of the flip-flop 126 is passed at a high level and transmits this level to the (−) input of the flip-flop 128 which changes state and its output 1 passes to a low level. The write unit control block 90 has been brought to its initial state. The output 1 of the flip-flop 126, which controls the line 130, being at a low level, closes the gates 182 to 189 of the block 91 controlling the exchanges between the indicator memory 25 and the interface adaptation circuit 70. Closing these gates therefore separates the indicator memory 25 from the interface adaptations circuit 70. These gates have only been open during the write cycle as is clearly seen in FIG. 7 which illustrates the signal chronogram operated during a write cycle of the indicator memory 25.

The write operations control block 92 receives a line 205 from the write unit control block 90 which proceeds from the 0 terminal of the flip-flop 124 and which ends on the input 2 of the inverse output conditioner 201. When the output 1 of the flip-flop 124 is at a low value, this means that there is no indicator configuration available in the interface adaptor circuit 70, the output 0 of this flip-flop is at a high value. Under these conditions, the input 2 of the gate 201 receives a positive signal. If a write command WRITING is transmitted by the microprocessor 48 on the input 1 of the gate 201, the output 3 of the latter is low since the two input conditions are satisfied. The output 3 of the gate 201 retransmits the low level of the input 2 of the gate 200 which, as a result, is closed. The gate 200 being closed, the validation signal SELECTION is not transmitted to the output 3 of this gate and is therefore not transmitted on the line 115 which controls the gates 109 and 123 of the indicator memory 25. As is explained in the MOTOROLA documents concerning the MCM 6605A circuits, the absence of the SELECTION signal in the presence of a WRITING order causes the execution of a refresher cycle of the contents of the code address. It is seen therefore that the call of a write cycle in the absence of an indicator configuration in the interface adaptation circuits 70, causes a refresher cycle; there is no alteration of the contents of the indicator memory 25, on the contrary there is a restoration of the stored signal level.

In the case where the write operations control block 92 receives on the line 205 a low level signal which means that an indicator configuration is available at the output of the interface adaptation circuit 70, the output 3 of the gate 201 is a high value since its input 2 is at a low value. The gate 200 is therefore open and the validation signal SELECTION passes through it to supply the line 115. The line 115 being at a high level, the indicator memory 25 can execute a normal write cycle.

In the case where the write operations control block 92 receives a low level signal on the terminal 1 of the conditioner 201, which that it is a matter of a read cycle, the output 3 of the gate 201 is brought to a high level. As before the gate 200 will be open and the indicator memory 25 can execute a read cycle since the validation signal SELECTION can carry the line 115 to a high level.

The block 91 controlling exchanges between the indicator memory 25 and the interface adaptation circuit 70 controls these exchanges in both write and read cases.

In the case of the write function it has been seen that the interface adaptation circuit 70 places the indicator configuration to be memorised on the bus 152 which is connected line by line to the gates 182 to 189; the line corresponding to the bit 0 of the indicator arrives on the input 1 of the gate 182 and so on up to the line corresponding to bit 7 which arrives on the input 1 of the gate 189. The gates 182 to 189 are controlled by their inputs 2 which are connected to the line 130. It has been seen that this line 130 is at a high level during a write cycle except when an indicator configuration is available on the bus 152. If this condition is required, the line 130 is at a high level and the contents of the lines will be transmitted to the integrated circuit 60 to 67 which corresponds to it from the outputs 3 of the gates 182 to 189 and across lines 166, 168, 170, 172, 174, 176, 178, 180.

If the indicator configuration is not available at the output of the interface adaptor circuit 70, the line 130 will be brought to a low level, the gates 181 to 189 will be closed; communication between the interface adaptation circuit 70 and the indicator memory 25 is cut.

In the case of a read cycle, the indicator memory 25 places the bits read by the integrated circuits 60 to 69 on the lines 167, 169, 171, 173, 175, 177, 179, 181, the bit zero on line 167 and so on up to bit 7 on line 181. These lines arrive directly on the one hand on the bus 152 and on the other hand on the multiple terminal 1 of the OR gate 153. The bus 152 places the configuration read in the indicator memory 25 at the multiple terminal 1 of the downstream buffer register 139. The gate 153 places a high level signal on its terminal 2 if at least one of the signals placed on its input has a high level. This signal is transmitted by the line 150 to the terminal 4 of the block 137. This block 137 initiates a high level signal on its terminal 1 which is connected to the interrupt request line INTERRUPT. In this manner the microprocessor 48 is informed of the presence of an indicator configuration available at the input of the interface adaptation circuit 70.

In the case where all the lines attached to the input 1 of the gate 153 are at low level, this means that there is no indicator at the address associated with the read address, the output 2 of the gate remains at a low level and there is no interruption request.

FIG. 7 shows the chronogram of the main electric signals occurring in the preceding circuits in the course of reading an indicator in the indicator memory 25.

The signals shown are:
Clock signal $\Phi_1$ at 190
Clock signal $\Phi_2$ at 191
The initialisation signal INITIALISAT at 192
The signal at the output 1 of the flip-flop 124 at 193
The signal at the output 1 of the flip-flop 126 at 194
The signal at the output 1 of the flip-flop 128 at 195
The signal carried by the connection 131 at 196
The signal for control of the write cycle WRITING at 197
The memory selection signal SELECTION at 198
The instant $t_0$ is the instant of starting the system.

It has been explained above that the flip-flop 126 and 128 mutally initialise. The case where the flip-flop 126 and the flip-flop 128 have their output 1 at a high position is shown in the figure. With the flip-flop 128 having its output 1 at a high value, the flip-flop 126 will switch and its output 1 will pass to a low value at the moment $t_1$ on the signal 194. Then the flip-flop 126 being initialised, its output 0 will switch flip-flop 128, whoose output 1 will pass to a low value on the descending front end of the clock signal $\Phi_2$: this is what happens at the moment $t_2$ on the signal 195.

The initialisation signal INITIALIS being applied to the input (−) of the flip flop 124, this flip-flop changes state and its output 1 passes to a low value on the descending front end of the clock signal $\Phi_2$: this is what happens at the moment $t_2$ on the signal 193. After this time $t_2$, the circuits of the write unification controller 69 are initialised and the initialisation signal can stop.

At the instant $t_3$, the microprocessor 48 requests a write cycle in the interface adaptor circuit 70 so as to load the configuration of an indicator. For this purpose, it sends a write control signal WRITING 197. On this order, the indicator configuration is transferred from data bus 26 into the interface adaptor circuit 70. When this transfer is carried out, the interface adaptor circuit 70 sends a signal 196 on the connection 131 to inform the cycle unification controller 69 of the availability of this configuration on the bus 152: this is what happens at instant $t_4$ on the signal 196.

This signal 196 is applied at the input (+) of the flip-flop 124 which changes over on the descending front of the clock signal $\Phi_2$: this is what happens at the instant $t_5$ of signal 193. The output 7 of the flip-flop 124 being at a high value changes over the flip-flop 126 on the descending front end of the clock signal $\Phi_1$: this is what happens at instant $t_6$ on signal 194.

This high signal 194 means that the writing of the indicator in the indicator memory 25 is possible. The microprocessor 48 controls the execution of a write signal in the indicator memory 25 by placing a WRITING pulse on the signal 197 situated between $t_7$ and $t_8$. During the same time interval the microprocessor 48 validates the write signal in the indicator memory 25 by placing a SELECTION pulse, which will authorise the execution of the write cycle, on the signal 198.

The output 1 of the flip-flop 126 being high, this changes the state of the flip-flop 128 on the descending front end of the clock signal $\Phi_2$: this is what happens at instant $t_8$ on the signal 195. At the same time the output 1 of the flip-flop 126 supplies the connection 130 which, on the one hand, supplies the exchange control block 91, and, on the other hand, supplies the input (−) of the flip-flop 124 which changes state on the descending front end of the clock signal $\Phi_2$: this is what happens at instant $t_8$ on signal 193. The output 1 of the flip-flop 124 has become low.

The output 1 of the flip-flop 128 being high will change the state of the flip-flop 126 on the descending front end of the clock signal $\Phi_1$, which is what happens at instant $t_9$ on signal 194. The changeover of this flip-flop will move to a low level the signal 194 which is carried by the connection 130 and which controls the communication between the interface adaptor circuit 70 and the indicator memory 25, this low level signifying that communication is cut.

The output 0 of the flip-flop 126 having become high, the latter changes over the flip-flop 128, whose output 1 of which passes to a low level on the descending front end of the clock signal $\Phi_2$: this is what happens at instant $t_{10}$ of signal 195. The write unification controller 69 is returned to the state where it was before this instant and is ready to satisfy a new demand for a cycle for writing an indicator in the indicator memory 25. Numerous changes and adaptions of the present invention will occur to those of ordinary skill in this art. It should therefore be appreciated that the foregoing embodiments of the present invention are illustrative only, the scope of the present invention being determined by reference to the appended claims.

We claim:
1. A data processing system comprising: a processor, an addressable data memory, and an indicator storage means operatively interconnected by a control bus, a data bus, an address bus and an indicator bus, said indicator storage means including a plurality of memory locations for storing a plurality of indicators generated by said processor, each stored indicator being associated with at least one of a plurality of corresponding predetermined memory locations whithin said addressable memory, and said storage means further including indicator detection means for detecting the outputting of an indicator from said indicator storage means, said outputting of an indicator corresponding to the presence of an indicator associated with the address memory locations called by the processor.

2. The system of claim 1 further including:
an address bus connecting said processor, data memory and storage means for carrying address words which access addresses in the addressable data memory, said data bus connecting the processor and said data memory to carry data between said processor and said addressable data memory, and said control bus interconnecting said processor, data memory and storage means to control exchanges of data within the system.

3. The system of claim 2 wherein said processor includes a processing circuit for processing data, an address circuit connected between the processing circuit and the address bus to address data in said addressable data memory and an input/output buffer register connected between processing circuit and the data bus to hold data to be exchanged between said processing circuit and said addressable data memory.

4. The system of claim 3 further comprising: an intermediate storage means connected to the address bus for storing indicators transmitted between said indicator storage means and said processing circuit.

5. The system of claim 4 wherein said indicator detection means includes means for triggering the sending of an information signal applied to said processing circuit indicative of the outputting of an indicator from said indicator storage means.

6. The system of claims 3, 4 or 5 wherein said indicator storage means comprises an addressable indicator memory which is addressed by said address circuit of said processor.

7. The system of claim 6 wherein said intermediate storage means includes an addressable interface adaptor, said adaptor interfacing said processor and said indicator memory.

8. The system of claim 7 wherein the system is comprised of integrated circuit chips.

9. The system of claim 5 wherein said intermediate storage means includes an addressable interface adaptor, said adaptor interfacing said processor and said indicator storage means, said information signal being an INTERRUPT control signal generated by said adaptor and each of said indicators representing a call on a subroutine.

10. The system of claim 9 wherein said indicator storage means comprises an addressable indicator memory and, upon the processor addressing one of said predetermined addresses within said addressable data memory, said address circuit simultaneously accesses the associated indicator within said indicator memory and said associated indicator is connected into said interface adaptor of said intermediate storage means for later transfer to said processor.

11. A data processing system comprising a processor, an addressable data memory and an indicator storage means for storing a plurality of indicators generated by said processor, each stored indicator being associated with at least one of predetermined addresses within said addressable memory, address bus means for interconnecting said processor, said data memory and said storage means for carrying address words which access addresses in the addressable data memory, data bus means for interconnecting said processor and said data memory for carrying data between said processor and said memory, control bus means for interconnecting said processor, said data memory and said storage means for controlling exchange of data within the system, said processor including processing circuit means for processing data, an address circuit connected between the processing circuit means and said address bus for addressing said addressable data memory, an input/output buffer register connected between said processing circuit means and said data bus for holding data to be exchanged between said processing circuit means and said data memory, said indicator storage means comprising an addressable indicator memory for containing an indicator to be modified by the processor when a predetermined address is called, an intermediate storage means connected to said data, address and control bus means and said addressable indicatory memory for storing the output of the addressable indicator memory as long as the called address is not changed and including an addressable interface adaptor interfacing said data bus means and an indicator detection means for detecting the outputting of an indicator from said indicator storage means, and further including an addressable register for storing the detected indicator and an interface adapter controller for controlling the said addressable register from said address and control bus means, said outputting of an indicator corresponding to said processor addressing the associated one of said predetermined addresses within said addressable memory, said indicator detection means being arranged to trigger an information signal to said processing circuit upon the outputting of an indicator from said indicator storage means, said information signal being an INTERRUPT command generated by said interface adaptor and each of said indicators representing an address for a subroutine whereby when said address circuit simultaneously accesses the indicator within said indicator memory corresponding to a predetermined address within the addressable data memory, said indicator is inputted into said interface adaptor of said intermediate storage means for later transfer of said processor.

12. The system of claim 11 wherein said intermediate storage means includes an indicator writing controller connected between said interface adaptor and said indicator memory.

13. The system of claim 12 wherein said indicator writing controller includes a plurality of gates, a flip-flop having an output which controls said plurality of gates, said gates being connected for controlling a transfer of said indicators from said interface adaptor to said indicator memory.

14. A method of operation of a data processing system including a processor, an addressable memory and indicator storage means operatively interconnected by a control bus, a data bus, an address bus, and an indicator bus, whereby data stored at predetermined locations of said memory can be particularized or marked by an indicator written into a corresponding storage location in the indicator storage means, the steps comprising:

(a) establishing a read operating cycle in the system by generating from said processor read signals on said control bus and a write operating cycle in the system by generating from said processor write signals on said control bus, upon the generation of a write cycle
(b) simultaneously addressing one of said predetermined locations of said memory and a corresponding location of said indicator storage means, (c) transmitting data to be stored to the addressed location of said memory via the data bus and storing said data at said predetermined location of said memory, (d) transmitting an indicator originating at the indicator storage means to be stored at said corresponding location of said indicator storage means via the indicator bus and storing said indicator at said corresponding location of said indicator storage means, said address of the location of the data and of the indicator being the same, respectively, for said memory and said indicator storage mans, upon the generation of a read cycle, (e) simultaneously addressing a location in the memory and the corresponding location in the indicator storage means and reading the data and indicator information at said locations, (f) transmitting the data and indicator information read at said locations to said processor via, respectively, the data bus and the indicator bus so as to generate an information signal indicative of the presence of an indicator at said corresponding location in the indicator storage means and the particularization of the data read at the addressed location of the memory.

15. The method of claim 14 wherein during the write cycle the processor writes a plurality of individual indicators into said indicator storage means.

16. The method of claim 15 wherein the writing of an indicator into said indicator storage means during a write cycle is accomplished by:
storing the indicator from said processor in an intermediate storage means, and then, transferring the indicator from said intermediate storage means into said indicator storage means, and, upon said processor reading one of said predetermined addresses during a read cycle transmitting said indicator to said processor by way of said intermediate storage means.

17. The method of claim 16 wherein, upon said processor reading one of said predetermined addresses, the indicator associated with the read address is transmitted to said processor following the sending of said information signal.

18. The method of claim 17 wherein said indicator is written from said intermediate storage means into said indicator storage means by way of the data bus, said data bus normally being used for transferring data into and out of said data memory, and said indicator causing said processor to call up a subroutine.

19. The method of claim 18 wherein said processor addresses said addressable memory by sending the address on an address bus and, upon said processor addressing one of said predetermined addresses, said address bus simultaneously accesses said indicator storage means so as to cause the indicator associated with the corresponding address of said indicator storage means to be transferred to said intermediate storage means.

20. The method of claims 17, 18 or 19 wherein said information signal is an INTERRUPT command signal.

* * * * *